United States Patent
Cicci et al.

(10) Patent No.: US 7,318,312 B2
(45) Date of Patent: Jan. 15, 2008

(54) ADJUSTABLE HAY RAKE

(75) Inventors: George Cicci, Fitchburg, WI (US); Bill Bassett, Brodhead, WI (US)

(73) Assignee: Kuhn Knight, Inc., Brodhead, WI (US)

(*) Notice: Subject to any disclaimer, the term of this patent is extended or adjusted under 35 U.S.C. 154(b) by 0 days.

(21) Appl. No.: 11/236,573

(22) Filed: Sep. 28, 2005

(65) Prior Publication Data

US 2007/0068134 A1    Mar. 29, 2007

(51) Int. Cl.
*A01D 76/00* (2006.01)
*A01D 78/00* (2006.01)
*A01D 80/00* (2006.01)
*A01D 84/00* (2006.01)

(52) U.S. Cl. .................................................. 56/377
(58) Field of Classification Search ................. 56/377, 56/375, 376, 365, 367, 366, 380, 392; 172/311, 172/456, 458, 662, 459, 632; 403/321; 111/52, 111/200

See application file for complete search history.

(56) References Cited

U.S. PATENT DOCUMENTS

| | | | | |
|---|---|---|---|---|
| 2,993,328 | A * | 7/1961 | Van Der Lely et al. | 56/377 |
| 4,077,189 | A * | 3/1978 | Hering | 56/11.9 |
| 4,214,428 | A * | 7/1980 | Caraway | 56/341 |
| 4,231,218 | A * | 11/1980 | Delgado | 56/377 |
| 4,723,402 | A * | 2/1988 | Webster et al. | 56/377 |
| 4,753,063 | A * | 6/1988 | Buck | 56/377 |
| 5,065,570 | A * | 11/1991 | Kuehn | 56/377 |
| 5,305,590 | A * | 4/1994 | Peeters | 56/377 |
| 5,540,040 | A * | 7/1996 | Peeters | 56/377 |
| 5,685,135 | A * | 11/1997 | Menichetti | 56/365 |
| 5,966,916 | A * | 10/1999 | Laing | 56/377 |
| 6,405,517 | B1 * | 6/2002 | Peeters et al. | 56/377 |
| 6,823,656 | B1 * | 11/2004 | Domgaard | 56/377 |
| 6,959,531 | B2 * | 11/2005 | Magnini | 56/365 |
| 7,100,351 | B2 * | 9/2006 | Rowse et al. | 56/377 |

* cited by examiner

*Primary Examiner*—Árpád Fábián Kovács
(74) *Attorney, Agent, or Firm*—Oblon, Spivak, McClellan, Maier & Neustadt, P.C.

(57) ABSTRACT

A carted hay rake is disclosed for raking cut crops into a windrow. The hay rake can include a wheeled cart, rake arms, and tine rake wheels. The rake arms are attached to a rake arm pivot, and can be extendable to a horizontal working position and retractable to a transport position. A positioning arm is utilized to change the angle of the rake arm between the working and transport position. An assist spring can help neutralize the weight of the rake arm while in the working position. The assist spring can be positioned horizontally.

18 Claims, 4 Drawing Sheets

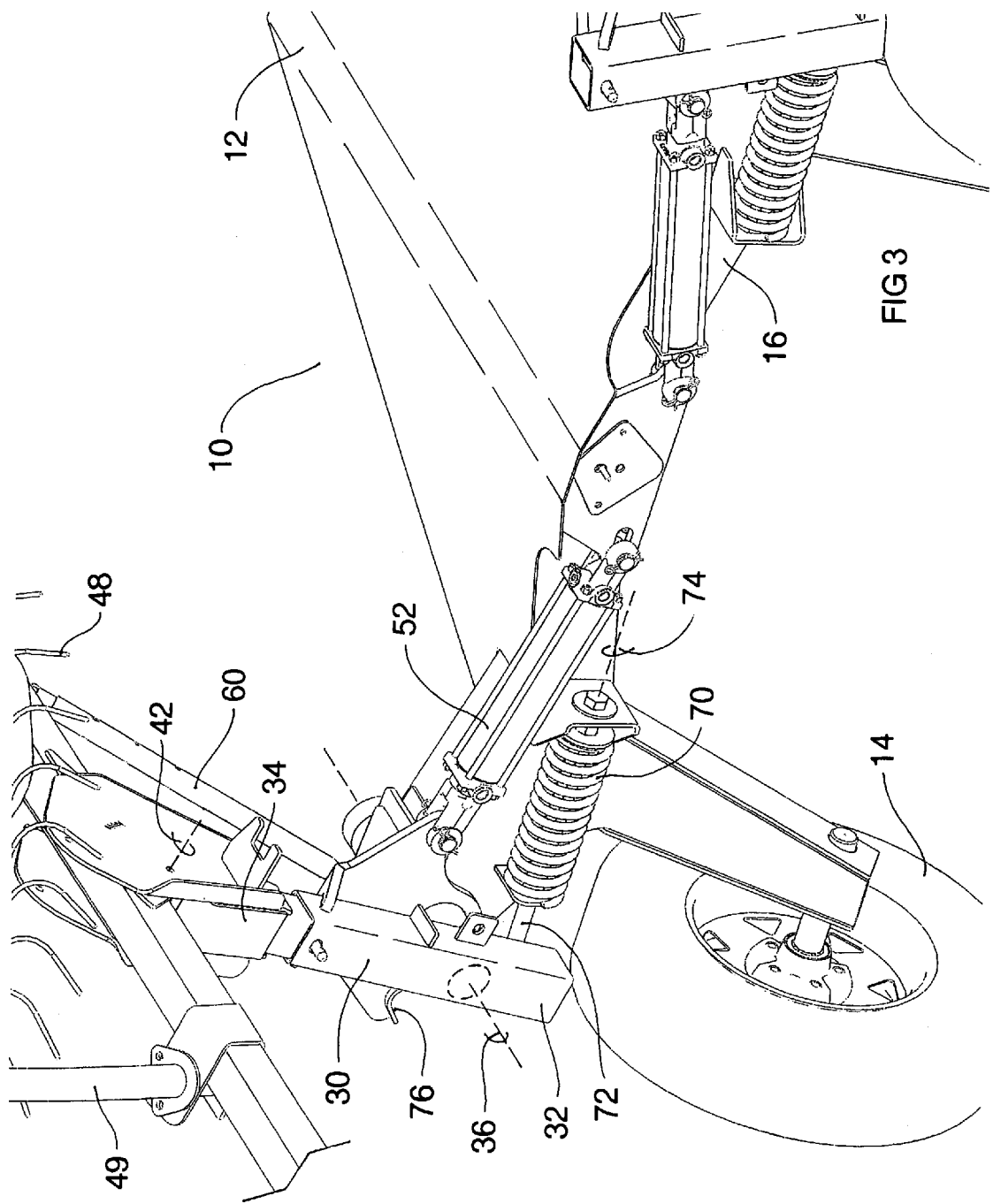

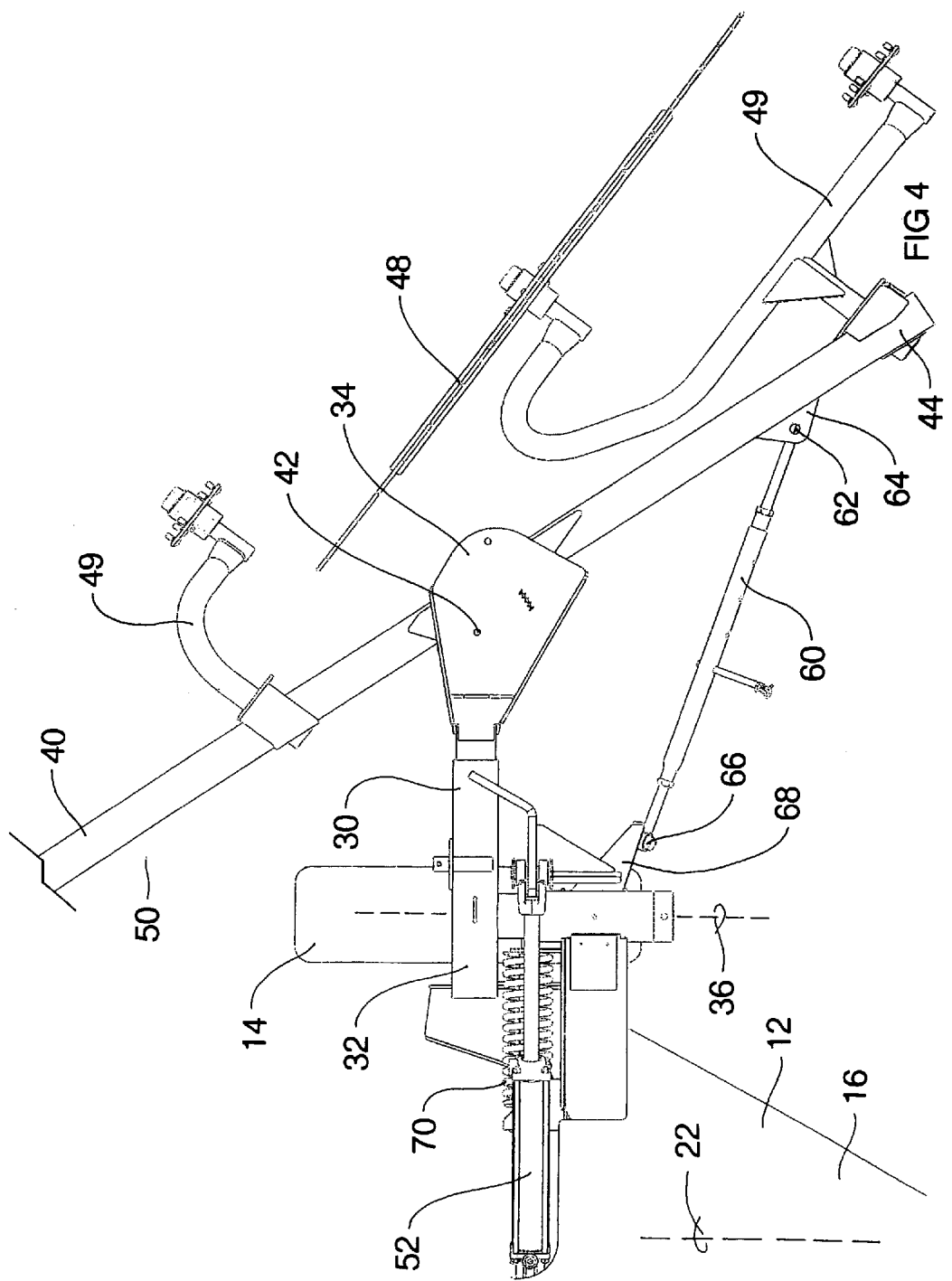

# ADJUSTABLE HAY RAKE

BACKGROUND OF THE INVENTION

1. Field of the Invention

This invention relates to an agricultural hay rake device.

2. Discussion of the Background

Agricultural hay rakes, specifically carted or folding hay rakes are used to form windrows from cut crops, including hay, straw and grasses. It is a typical agricultural process to cut these crops, rake or merge them into windrows where additional drying may occur, collect and store the crops, and subsequently feed the crops to livestock.

Modern power equipment for raking cut forage employs rotating tined wheels and particularly banks of rotating tined wheels that are moved through a field of cut forage to form windrows. These banks of wheel rakes can be quite wide to reduce both the time and number of passes required to rake a field. Because of the wide widths employed by hay rakes, they typically have pivot points on each rake arm in order to fold to a narrower width for transport. Wide rakes thereby offer a potential time and cost savings to agriculture and enhance the raking process to best utilize favorable weather conditions, or to maximize the capacity utilization of the next piece of hay raking equipment.

The wide rakes require longer rake arms to support the banks of tined wheels used for efficient raking. These long rake arms can be heavy and cumbersome both in operation and in transport. While in operation, the rake arms are normally in a horizontal position and are preferably counterbalanced to a relatively neutral weight, to allow the tined wheels to "float" over the uneven ground without digging into the ground or skipping over the cut crop. Many of the known hay rakes use a vertically positioned expansion spring or shock absorbing material to help lift and cushion the weight of the rake arm while in operation.

One disadvantage of a vertical style spring or shock is that it is somewhat limited to its length, strength, and functionality. This is because the axle and wagon assembly at the spring mounting point is generally horizontal, and cannot adequately support a long vertical spring arrangement. The result is that vertical springs are typically short, requiring a stiff spring construction and a short effective range of motion.

Carted rakes normally have a pair of folding arms that are pivotally attached at one end to the wheeled cart. A pair of rake arms are pivotally attached to the other end of the folding arms, and include a plurality of tine rake wheels. The angle created by the pivot point between the folding arms and the rake arms is manually adjustable using a variety of adjustment methods. The angle of the rake arms is normally set to the optimum working position, and this same angle is maintained as the rake arm assemblies are pivoted up into a more vertical transport position.

In carted hay rakes where the angle between the rake arms and the folding arms is manually adjustable, one disadvantage is that the transport position of the rake assembly is not as compact, since the rake arms are angled upward while in transport. Another disadvantage is that the overall height of the hay rake in transport position is higher. Another disadvantage is that the rear end of the rake arms is lower, allowing the tine rake wheels to create more of a hazard to bystanders.

SUMMARY OF THE INVENTION

Accordingly, one objective of the present invention is to provide a hay rake which addresses the problems associated with known devices for raking cut crops. Moreover, depending on the embodiment of the invention, one or more of the capabilities set forth below may be achieved.

For example, an embodiment of the present invention can provide a hay rake with rake arms which are "floated" while in operating position by using a substantially horizontal oriented spring, shock or cushion, allowing more weight reduction to be applied to the rake arm with minimal structural modifications. This horizontal spring can be longer with less stiffness than a vertical spring, providing a wider range of motion for the rake arms, with more even support during field travel.

An embodiment of the present invention can provide a hay rake where the rake arm actively pivots at the folding arm when transitioning between transport and raking positions, to provide a more compact configuration for transport.

Further, an embodiment of the present invention can provide a hay rake where the rake wheels fold and nest together for transport, so that the rake tines protrude less toward the outside, to present less of a hazard to bystanders.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where:

FIG. 3 is a rear view of the wheel rake assembly in a transport position in accordance with an embodiment of the present invention;

FIG. 4 is a top view of the wheel rake assembly in a working position in accordance with an embodiment of the present invention.

DETAILED DESCRIPTION OF THE PREFERRED EMBODIMENTS

Figure 1:
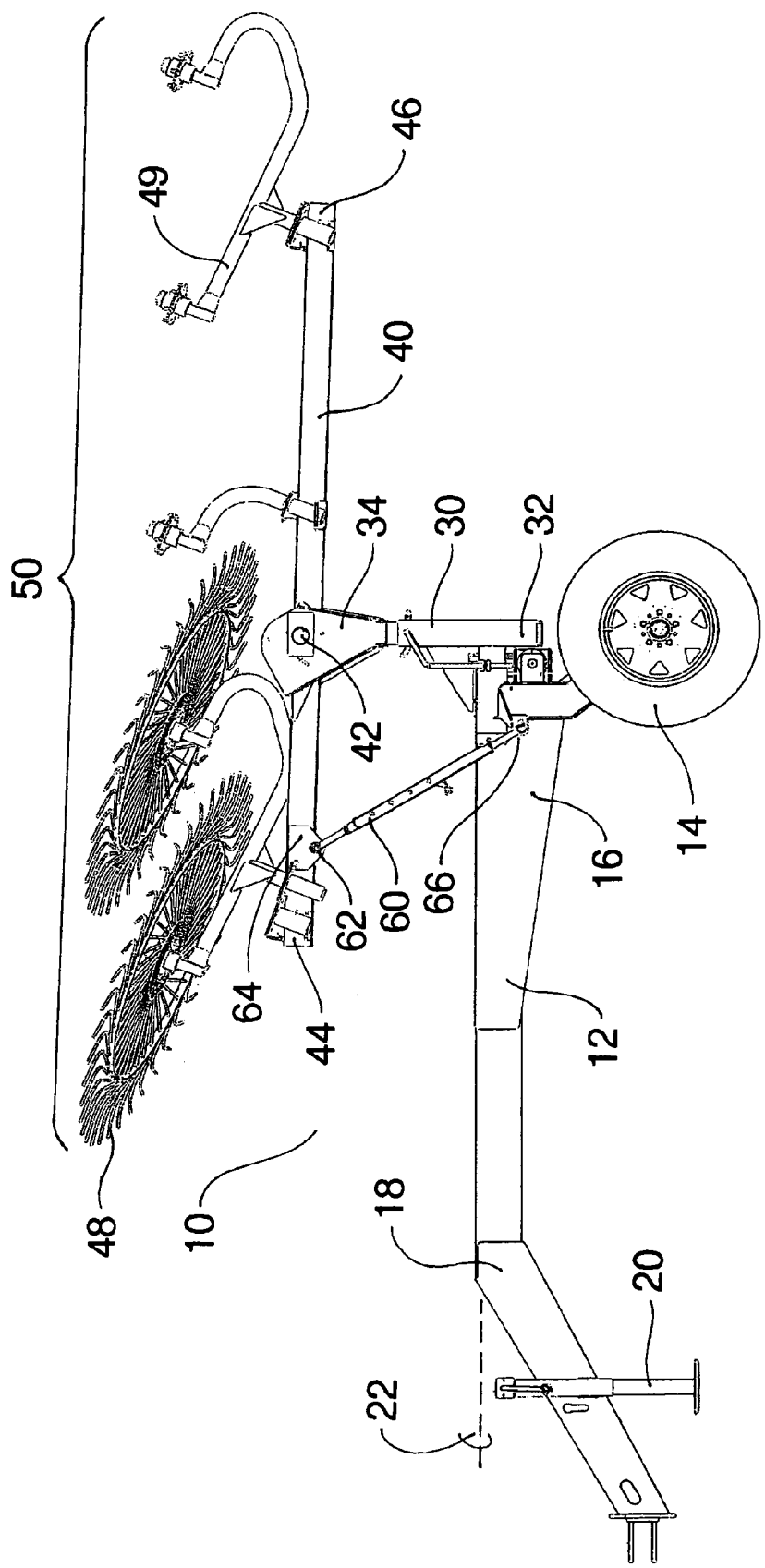
FIG. 1 is a side view of the wheel rake assembly in a transport position in accordance with an embodiment of the present invention.
Figure 2:
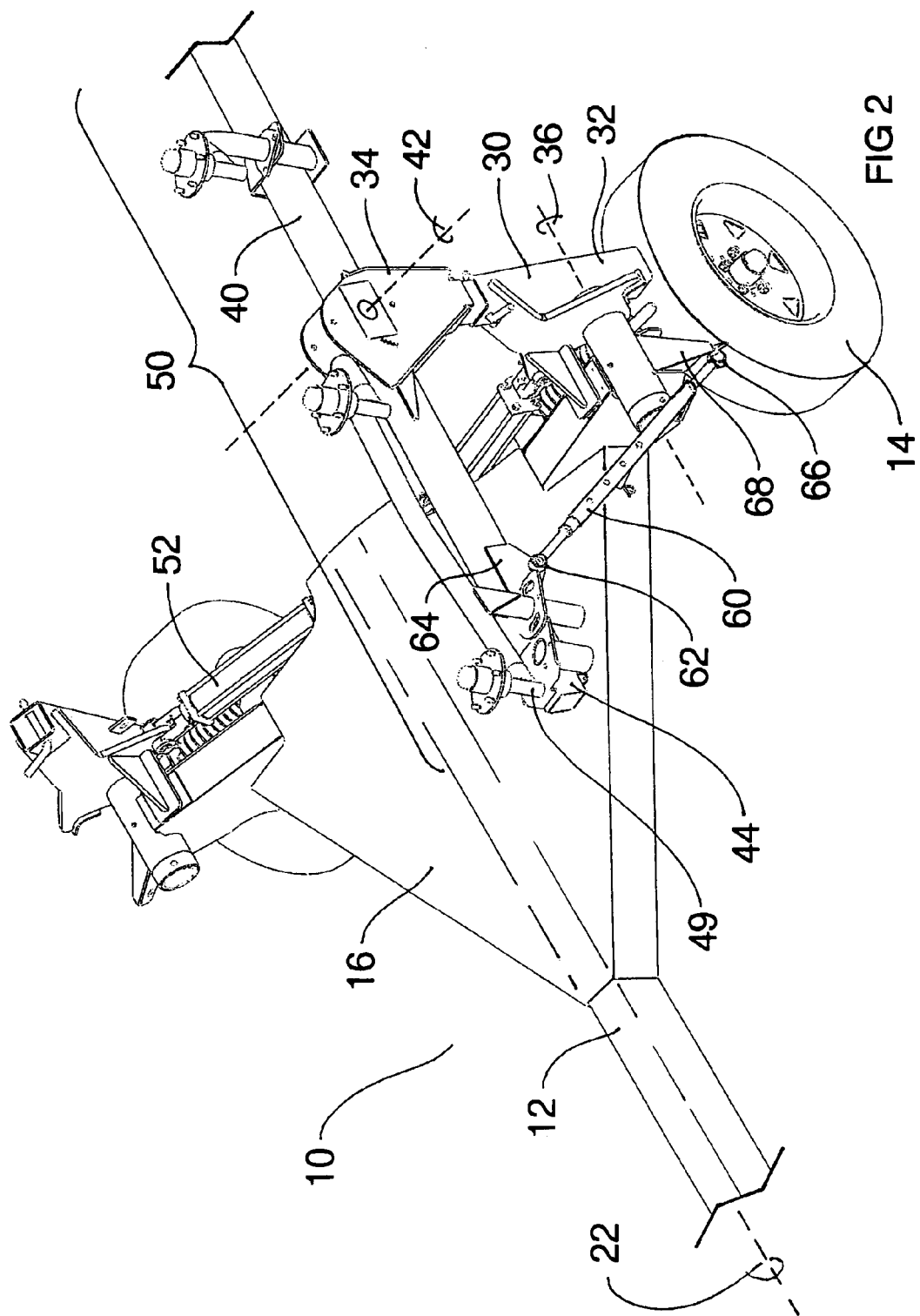
FIG. 2 is a top isometric view of the wheel rake assembly in a transport position in accordance with an embodiment of the present invention.

With reference to FIGS. 1-4, a non-limiting hay rake apparatus is generally designated by the reference number 10. The hay rake 10 includes a wheeled cart 12, which can further include tires 14, a frame 16, a tongue hitch 18 for attachment to a tractor or towing means (not shown) and a jackstand 20. The tongue can be oriented along a longitudinal axis 22, which is generally inline with the direction of travel. A folding arm 30 includes a first end 32, and a second end 34. The first end 32 of the folding arm 30 is attached, or mechanically coupled, to the wheeled cart 12 at a pivot axis 36. The second end 34 of the folding arm 30 is attached, or mechanically coupled, to a rake arm 40 at a rake arm axis 42.

The rake arm 40 has a leading end 44 and a trailing end 46. A plurality of tine rake wheels 48 are attached to rake wheel arms 49 along the length of the rake arm 40 to rake the hay materials when in operation. The combination of the folding arm 30, the rake arm 40, the tine rake wheels 48 and the rake wheel arms 49 make up the rake arm assembly 50. A lift cylinder 52 can be attached, or mechanically coupled, to the first end 32 of the folding arm 30, and also to the wheeled cart 12, to allow the folding arm 30 to be mechanically pivoted around the pivot axis 36. The lift cylinder 52 can be a hydraulic device. The lift cylinder can be controlled by a manually operated valve at the tractor. The pivot axis 36 is preferably oriented substantially parallel to the longitudinal axis 22 of the wheeled cart 12.

A positioning arm 60 has a first joint 62 which can be attached, or mechanically coupled, to a first attachment point 64. In the non-limiting example shown in FIGS. 1-4, the first attachment point 64 is adjustably connected to the leading end 44 of the rake arm 40. In some embodiments, the first attachment point 64 is fixed and not adjustable. In other embodiments, the first attachment point 64 can be adjustably coupled to the trailing end 46 of the rake arm 40. The positioning arm 60 has a second joint 66 which can be attached, or mechanically coupled, to a second attachment point 68 which is connected to the wheeled cart 12. The length of the positioning arm 60 can be adjustable. The positioning arm 60 can be a lift cylinder, and can be a hydraulic device. However, during normal operation of the rake arm 40, the positioning arm 60 preferably has a fixed length.

In order to reduce the cost, the adjustment of the positioning arm 60 can be manual, for example via a turnbuckle arrangement with locking pins for coarse adjustment. However, the adjustment of the positioning arm 60 can be also controlled otherwise. The positioning arm 60 helps to change the position of the rake arm 40 relative to the folding arm 30 around the rake arm axis 42 as the folding arm is moved by the lift cylinder 52. The rake arm axis 42 is preferably oriented substantially perpendicular to the longitudinal axis 22 of the wheeled cart 22. In a preferred embodiment, the positioning arm 60 changes the position of the rake arm 40 at the same time as the folding arm 30 pivots. In other words, the arms 60 and 30 are activated at the same time. When the folding arm 30 pivots, the fixed-length positioning arm 60 automatically re-orients the position rake arm 40 from a working position to a transport position. This reorientation happens because of the described geometry between the attachment point on the frame 16 and the attachment point on the rake arm 40. The rake arm 40 is preferably parallel to the longitudinal axis 22 when in the raised transport position, and extends angularly to the longitudinal axis 22 when in the lowered working position.

Preferably there are two sets of folding arms 30, rake arm assemblies 50, and positioning arms 60 mirrored on each side of the longitudinal axis. These assemblies preferably move and work together, but can also be arranged to work independently of each other, if desired.

An assist spring 70 can be attached, or mechanically coupled, to the wheeled cart to help reduce the downward pressure of the rake arms 40 when in the lowered operating or working position. The assist spring 70 can be a coil spring. However, the assist spring 70 can have other configurations, such as for example a cushion, a bumper or a shock absorbing device. The assist spring 70 can include a plunger 72 along the horizontal assist axis 74. A spring stop 76 can be attached to the first end 32 of the folding arm 30. The spring stop 76 aligns with the plunger 72 along the spring assist axis 74 when the rake arm 40 is in the operating position so that the spring stop 76 can apply a force to the assist spring 70 when the rake arm 40 is in the operating position. This configuration can counterbalance, at least partly, the weight of the rake arm in the lowered operating position.

In the operation of the wheel rake apparatus 10, the tongue hitch 18 of the wheeled cart 12 can be connected to a towing vehicle such as a tractor (not shown). To operate the apparatus 10, the rake arms 40 are lowered to a horizontal position using lift cylinders 52. The positioning arms 60 angle the rake arms such that the leading ends 44 are further apart from each other than the trailing ends 46 when in the operating position. This creates a "V" shape of the raking arms 40, with the wide portion of the "V" toward the front of the machine.

The rake arms 40 have a plurality of tine rake wheels 48 attached to rake wheel arms 49 and evenly spaced along the length of the rake arms 40. Once the rake arms 40 are parallel to the ground, the tine rake wheels 48 engage the ground, and the apparatus 10 is pulled forward by the towing vehicle through the cut crops in the field. The forward movement of the apparatus 10 in combination with ground engagement of the tine rake wheels 48 causes the tine rake wheels 48 to rotate and rake the cut crops toward the center of the apparatus, leaving a windrow of crops behind. Preferably, the tine rake wheels 48 are configured to contact the ground in the operating position, but without excessive pressure to cause them to dig in or bind. To attain this even pressure, assist springs 70 can be used to minimize the downward pressure of the heavy rake arms 40 due to gravity. The assist spring 70 pressure can be adjustable for a variety of ground conditions or other variables.

Obviously, numerous modifications and variations of the present invention are possible in light of the above teachings. It is therefore to be understood that, within the scope of the appended claims, the invention can be practiced otherwise than as specifically described herein.

What is claimed as new and desired to be secured by Letters Patent of the United States is:

1. A hay rake apparatus comprising:
   a wheeled cart including a wheel configured to rotate around a wheel axis and roll on a plane of the ground;
   a first rake arm;
   a first folding arm including a first end and a second end, said first end pivotally connected to said wheeled cart and said second end pivotally connected to said first rake arm; and
   a positioning arm with a first joint pivotally attached to said first rake arm, and a second joint of said positioning arm pivotally attached to said wheeled cart, so that when said folding arm is pivoted, said positioning arm causes the angle between the first rake arm and said folding arm to changes,
   wherein said first folding arm is configured to pivot so as to move said first rake arm between a first lowered position and a first raised position, and while the first rake arm is in the first raised position the first rake arm is farther from the plane of the ground than when the first rake arm is in the first lowered position.

2. The apparatus of claim 1, wherein said first rake arm includes a leading end and trailing end.

3. The apparatus of claim 2, wherein said first joint of said positioning arm is pivotally attached to said leading end of said first rake arm.

4. The apparatus of claim 2, wherein said first joint of said positioning arm is pivotally attached to said trailing end of said first rake arm.

5. The apparatus of claim 1, wherein said positioning arm length is adjustable.

6. The apparatus of claim 1, wherein a first attachment point of said first rake arm is adjustable.

7. The apparatus of claim 1, wherein a pivot axis, about which the first end of said folding arm pivots relative to said wheeled cart, is approximately parallel to a longitudinal axis of the wheeled cart.

8. The apparatus of claim 1, wherein said positioning arm is configured to position said first rake arm to be substantially parallel to a longitudinal axis of said wheeled cart when in a transport position, and configured to position said first rake arm to be not substantially parallel to said longitudinal axis when said first rake arm is in a working position.

9. The apparatus of claim 1, wherein the angle between said first rake arm and said folding arm changes during a movement of said first rake arm from a transport position to a working position.

10. The apparatus of claim 1, further comprising a plurality of tine rake wheels attached to said first rake arm.

11. The apparatus of claim 2, wherein,
while the first rake arm is in the first lowered position, the leading end and the trailing end of the first rake arm are first and second distances from the wheeled cart, respectively,
when the first rake arm is in the first raised position, the leading end and the trailing end of the first rake arm are third and fourth distances from the wheeled cart, respectively,
the third distance is different from the first distance, and the fourth distance is different from the second distance.

12. A hay rake apparatus comprising:
a wheeled cart;
a first rake arm;
a first folding arm including a first end and a second end, said first end pivotally connected to said wheeled cart and said second end pivotally connected to said first rake arm; and
a positioning arm with a first joint pivotally attached to said first rake arm, and a second joint of said positioning arm pivotally attached to said wheeled cart, so that when said folding arm is pivoted, said positioning arm causes the angle between the first rake arm and said folding arm to change,
wherein said first folding arm is configured to pivot so as to move said first rake arm between a first lowered position and a first raised position, and
wherein said first rake arm is substantially parallel to a longitudinal axis of said cart in said first raised position and is not substantially parallel to said longitudinal axis of said cart in said first lowered position.

13. The apparatus of claim 12, further comprising:
a second rake arm; and
a second folding arm mechanically coupled to said cart and to said second rake arm;
wherein said second folding arm is configured to pivot so as to move said second rake arm between a second lowered position and a second raised position, and
wherein said second rake arm is substantially parallel to said longitudinal axis of said cart in said second raised position and is not substantially parallel to said longitudinal axis of said cart in said second lowered position.

14. The apparatus of claim 13, wherein said first and second rake arms each have a leading end and a trailing end, and wherein in said lowered position said leading ends are further apart from each other than said trailing ends.

15. The apparatus of claim 12, further comprising a spring which is oriented substantially horizontally and configured to at least partly counterbalance a weight of said first rake arm in said lowered position.

16. The apparatus of claim 12, wherein said first folding arm is configured to pivot about an axis which is oriented substantially parallel to said longitudinal axis of said cart.

17. The apparatus of claim 12, further comprising a lift cylinder mechanically coupled to said first folding arm and to said cart and configured to cause said first folding arm to pivot.

18. The apparatus of claim 12, wherein said first rake arm is configured to pivot about an axis which is substantially perpendicular to said longitudinal axis of said cart.

\* \* \* \* \*